(12) United States Patent
Sato

(10) Patent No.: US 7,946,640 B2
(45) Date of Patent: May 24, 2011

(54) INSTRUMENT PANEL, MODULE, AND VEHICLE

(75) Inventor: Kan'ichi Sato, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 12/097,450

(22) PCT Filed: Dec. 15, 2006

(86) PCT No.: PCT/JP2006/325038
§ 371 (c)(1),
(2), (4) Date: Feb. 26, 2009

(87) PCT Pub. No.: WO2007/069720
PCT Pub. Date: Jun. 21, 2007

(65) Prior Publication Data
US 2009/0174214 A1 Jul. 9, 2009

(30) Foreign Application Priority Data
Dec. 15, 2005 (JP) ................................. 2005-361326

(51) Int. Cl.
*B62D 25/14* (2006.01)
*B60K 37/02* (2006.01)
(52) U.S. Cl. .............................. 296/72; 296/70; 180/90
(58) Field of Classification Search .................... 296/70, 296/72, 208; 180/90
See application file for complete search history.

(56) References Cited

U.S. PATENT DOCUMENTS

| 3,912,036 | A | * | 10/1975 | Davis et al. ...................... 180/90 |
| 4,309,012 | A | * | 1/1982 | Fukunaga ..................... 248/27.1 |
| 4,646,879 | A | | 3/1987 | Mahler et al. |
| 5,026,739 | A | * | 6/1991 | Matsushima et al. .......... 521/177 |
| 5,358,300 | A | * | 10/1994 | Gray .............................. 296/192 |
| 5,979,965 | A | * | 11/1999 | Nishijima et al. .............. 296/70 |
| 6,071,591 | A | | 6/2000 | Dausch |
| 2005/0217913 | A1 | | 10/2005 | Sakamoto |

FOREIGN PATENT DOCUMENTS

JP 56-050833 5/1981
(Continued)

OTHER PUBLICATIONS

PCT/JP2006/325038, Notification of Transmittal of Translation of the International Preliminary Report on Patentability, 5 pages.

(Continued)

*Primary Examiner* — Dennis H Pedder
(74) *Attorney, Agent, or Firm* — Fish & Richardson P.C.

(57) ABSTRACT

An instrument panel comprising a synthetic resin base material and a skin material covering and integrated with the surface of the synthetic resin base material. The instrument panel may be disposed ahead of a seat within a driving cab in a vehicle. A metal support is integrally formed in the synthetic resin base material and insert-molded in such a state that a part of the metal support is protruded from the synthetic resin base material. The site protruded from the synthetic resin base material has a frame fixing section, which can be fitted and fixed to the cab frame of the vehicle. In such an the instrument panel, even upon exposure to vibration or impact, neither drop of various mounted instruments nor damage to the instrument panel takes place. Further, in mounting various instruments, the necessary number of components can be reduced, and stable mounting of instruments can be realized.

10 Claims, 11 Drawing Sheets

FOREIGN PATENT DOCUMENTS

| | | |
|---|---|---|
| JP | 59-37134 | 3/1984 |
| JP | 61-54330 | 3/1986 |
| JP | 63-100335 | 6/1988 |
| JP | 02-076712 A | 3/1990 |
| JP | 6-820 | 1/1994 |
| JP | 10-315245 | 12/1998 |
| JP | 11-512573 A | 2/1999 |
| JP | 2000-6283 | 1/2000 |
| JP | 2001-009956 A | 1/2001 |
| JP | 2003-48221 | 2/2003 |
| JP | 2005-75089 | 3/2005 |
| JP | 2005-289112 | 10/2005 |

OTHER PUBLICATIONS

Decision for Rejection issued by the Japanese Patent Office on Oct. 5, 2010 in corresponding Japanese Priority Application No. 2005-361326, 4 pages.

* cited by examiner

INSTRUMENT PANEL, MODULE, AND VEHICLE

CROSS-REFERENCE TO RELATED APPLICATIONS

This application is a 371(c) National Phase of International patent application Serial No. PCT/JP2006/325038 filed Dec. 15, 2006 which claims priority to Japanese patent application Serial No. 2005-361326 filed Dec. 15, 2005, the entire disclosures of which are incorporated herein in their entireties.

TECHNICAL FIELD

The present invention relates to: an instrument panel installed in the cab of a vehicle; a module having meters and suchlike mounted in the instrument panel; and a vehicle having the module installed in the cab. In particular, the present invention relates to: an instrument panel installed in the cab of a work vehicle and designed such that even if the instrument panel is subjected to heavy vibration or heavy impact load during work, damage to the instrument panel or falling of devices mounted in the instrument panel are prevented; a module using the instrument panel; and a work vehicle.

BACKGROUND ART

Generally, an instrument panel is installed in the front of a cab of a work vehicle such as a shovel or a dump truck. Mounted on the instrument panel are many devices and components such as a meter panel that has meters and suchlike thereon, a liquid crystal monitor that displays images of the surroundings of the vehicle, a car stereo (including a radio), a navigation system, and a glove box. In the instrument panel, HVAC air blower outlets with grills attached thereto are formed in the cab side surface and, in addition, defroster air blower outlets are formed in the upper face, etc., located below and opposite windshield. These air blower outlets are connected to corresponding HVAC (Heating, Ventilating, Air Conditioning) and defroster ducts (hereinafter simply referred to as "HVAC ducts and suchlike").

The instrument panel is formed as described below in order to securely withstand vibration so as to prevent comparatively heavy devices (e.g., a liquid crystal monitor, car stereo or navigation system) installed in such an instrument panel in a work vehicle from becoming detached or falling when the instrument panel is subjected to heavy vibration or heavy impact load during the operation of the work vehicle.

First, into the frame of a work vehicle a framework for an instrument panel is formed by sheet metal working. Heavy devices and suchlike are directly mounted in the framework, and HVAC ducts and suchlike are also fitted in the framework. Subsequently, the HVAC ducts and suchlike are connected to a cover molded from a synthetic resin. Then, the synthetic resin cover is fitted over the framework and thus the instrument panel is formed. Accordingly, even if the heavy devices and suchlike are subjected to a large vibration acceleration (about 7 G at the maximum) during the operation of the work vehicle, the heavy devices and suchlike are prevented from sliding by their own momentum or, consequently, becoming detached from mounted position or falling.

On the other hand, an instrument panel installed in the cab of an ordinary vehicle is less likely to be subjected to strong vibration or impact unlike a work vehicle as described above. Instead, an ordinary vehicle generally demands excellence and a high degree of freedom in design. Accordingly, unlike the above-described instrument panel for a work vehicle, an instrument panel for an ordinary vehicle is formed as described below. First, a synthetic resin is molded into a predetermined shape and its surface is integrally covered with a skin material, thereby forming the instrument panel. Then, various devices such as a meter panel are mounted in the thus obtained synthetic resin instrument panel, thereby composing a module. This module is mounted in a vehicle body frame such that an instrument panel with the various devices mounted therein is installed in front of a driver's seat in a cab.

A specific example of such an instrument panel used in an ordinary vehicle or suchlike is disclosed in, for example, Japanese Patent Laid-Open Application No. 2005-75089 (Patent document 1). In the instrument panel described in this patent document 1, a module is constructed by installing a meter panel, glove box, etc., into the instrument panel formed by molding a synthetic resin. Next, this module is mounted in a vehicle body frame via a reinforcement bracket and connected to HVAC ducts and defroster ducts. In the patent document 1, after the module is mounted in a vehicle body frame, a car stereo, and so on are mounted in predetermined places in the instrument panel. However, heavy devices such as a car stereo may be mounted in an instrument panel body together with the meter panel during the configuration of the module.

Patent document 1: Japanese Patent Laid-Open Application No. 2005-75089

DISCLOSURE OF THE INVENTION

Problems to Be Solved by the Invention

In an instrument panel installed in a work vehicle, various devices such as a liquid crystal monitor are directly mounted in a framework, formed of sheet metal, so as not to fall even if subjected to heavy vibration or heavy impact load during the operation of the work vehicle. However, in such an instrument panel composed by mounting various devices into the framework formed of sheet metal, the number and nature of the components items of the various devices may be very large, which has been a contributing factor in increasing costs, compared to a synthetic resin instrument panel as in an ordinary vehicle, into which devices are mounted to form a module.

In addition, sheet metal working cannot ensure high accuracy in the dimensions of a framework or in mounting the various devices. When a resin cover is placed over the instrument panel framework in which the various devices have been mounted, displacement between the resin cover and the framework and devices mounted therein may be inevitable. Accordingly, the formation of an instrument panel involves positional adjustments of various devices mounted therein, adjustments of the shape and mounted position of the resin cover, and other adjustments, leading to an increase in manhours required for assembly.

As a means for solving the foregoing problems, a technology has been proposed in which an instrument panel body installed in a work vehicle is molded from a synthetic resin as in an ordinary vehicle, and various devices are mounted in the thus obtained synthetic resin instrument panel body, thereby forming a module that will be fixed to the body frame of a work vehicle.

For instance, some European manufacturers such as Fritzmeier Systems GMBH&Co. promote module formation by molding an instrument panel from a synthetic resin through a rotation molding method and then mounting various devices into the synthetic resin instrument panel. Module formation is becoming practical in work vehicle manufacture as well. This makes it possible to reduce the number of components of various devices and man-hours required for assembly, which has been difficult to achieve in conventional instrument panels used in work vehicles.

However, such synthetic resin instrument panels used for work vehicles are inferior to conventional instrument panels formed of sheet metal in withstanding vibration, because various devices are directly mounted in the synthetic resin. For this reason, the application of such instrument panels has been limited to small work vehicles that are less subject to vibration acceleration and that are comparatively light in weight, as for monitor, etc. In particular, an instrument panel with various devices mounted therein is directly fixed to a bracket and a cab frame with bolts and etc. Accordingly, if the instrument panel is subjected to great vibration acceleration during the operation of the work vehicle, the fixing parts of the instrument panel and bracket and the fixing parts of the instrument panel and cab frame are highly likely to be subjected to great stress, with the result that the instrument panel may be damaged in or around the fixing parts.

In addition, as a method for molding the instrument panel from a resin, the rotation molding method, by which a hollow shape of uniform thickness can easily be formed, has been adopted. This makes it difficult to form the shape of a small R and limits the shape of the appearance of the instrument panel. In addition, the synthetic resin material is limited to a low density polyethylene (LDPE). Further, the surface of the instrument panel does not allow easy formation of a crimped pattern and is, therefore, limited to basically a satin finish. Limiting the resin material to LDPE makes it difficult to post-paint the instrument panel. Accordingly, the instrument panel color is limited to light gray or black, making the quality of the instrument panel look poor. These drawbacks greatly limit the application of the rotation molding method in instrument panel formation.

In the case described above, in order to produce a synthetic resin instrument panel in the form of a module, HVAC ducts and defroster ducts are integrally formed in the instrument panel during rotation molding. The shapes of the ducts must match the shapes on the mounting face of the instrument panel. However, the rotation molding method limits the shapes of ducts due to the inner diameter of dies and thickness of the molding to be obtained, which makes it extremely difficult to adequately control flows of air. Since the resin material for forming the ducts is limited to LDPE, the duct surfaces suffer from condensation in cold regions, high humidity areas, etc., and consequently, metal parts around the ducts may rust.

Means for Solving the Problems

The present invention has been proposed in view of the problems discussed above. It is therefore an object of the present invention to provide an instrument panel installed in the cab of a vehicle such as a work vehicle, the instrument panel being designed such that even if it is subjected to heavy vibration and heavy impact load, the falling of various devices mounted in the instrument panel or damage to the instrument panel are prevented and, in addition, various devices can be stably mounted with fewer components. It is another object of the invention to provide an instrument panel that eliminates the need to fit HVAC ducts and suchlike after the formation of the instrument panel, that is rigid and strong, and that prevents condensation on the ducts and suchlike.

In order to achieve the foregoing object, the present invention provides an instrument panel, which comprises a synthetic resin base material and a skin material integrally covering a surface of the synthetic resin base material and can be installed in front of a driving seat in a cab of a vehicle, wherein: integrally formed in the synthetic resin base material is a metal support insert-molded such that a part of the metal support projects from the synthetic resin base material; in an area of the metal support projecting from the synthetic resin base material is a frame fixable section, which can be fitted and fixed to a cab frame on the vehicle; the fixable section comprises a first fixable part bent in a hook shape so as to hook on the cab frame and fixed thereto, and a second fixable part having through openings so that the second fixable part can be fixed to the cab frame with a screw or a bolt; and the metal support also has an instrument mounting section in which various devices such as meters can be mounted.

In the instrument panel of the foregoing configuration according to the present invention, it is preferable that the synthetic resin base material be formed from structural foamed polyurethane. In this case it is preferable that a density of the structural foamed polyurethane is 0.35 g/cm$^3$ or more and 0.85 g/cm$^3$ or less.

In the present invention, a plurality of ribs is formed by an integral molding on a rear side of the synthetic resin base material. In this case, the ribs compose walls of blower passages, and opening surfaces defined by the walls are closed by covering materials, thereby defining two or more blower passages. It is preferable that passage openings provided for an HVAC and a defroster be defined in the blower passages.

The present invention makes it possible to provide a module in which various devices such as meters are mounted in an instrument panel of the foregoing configuration. The present invention can also provide a vehicle in which a frame fixable section of the module of the foregoing configuration is fixed to the vehicle body frame of the vehicle.

Effects of the Invention

An instrument panel according to the present invention includes: a synthetic resin base material; a skin material integrally covering the surface of the synthetic resin base material; and a metal support insert-molded integrally in the synthetic resin base material. Parts of the metal support project from the synthetic resin base material. This projecting part has a frame fixable section, which is fixed to a vehicle body frame.

In the instrument panel with such a configuration, the metal support is insert-molded in the synthetic resin base material. Accordingly, even where the instrument panel is used in, for example, a work vehicle, the instrument panel is sufficiently strong and rigid to withstand vibration or shock during heavy work. For example, after a module is formed by mounting various devices, the module can be fixed to the vehicle body frame by means of the metal support projecting from the synthetic resin base. Accordingly, the strength of the fixable section relative to the vehicle body frame can be greatly improved. This provides an excellent instrument panel that is durable in the long term while preventing the synthetic resin base material from being damaged even in a severe work environment.

In particular, the frame fixable section of the metal support has first fixable parts that have been bent, and second fixable parts that have been holed. This makes it possible to hook the first fixable parts of the frame fixable section onto the cab frame and to fix together the second fixable parts and the cab frame with screws or bolts. Thus, the instrument panel can be firmly and stably fixed to the vehicle body frame.

The metal support also has an instrument mounting section in which various devices such as meters can be mounted. This makes it possible to fix various devices, which may be heavy devices, into the metal support, thereby stably mounting the devices in predetermined areas of the instrument panel while securely supporting them by means of the metal support. This prevents various devices fixed in the metal support from becoming detached or falling even if the instrument panel is subjected to heavy vibration or heavy impact load.

Forming the synthetic resin base material of the instrument panel of the present invention from hard polyurethane foam yields advantageous effects such as lightness of weight, high rigidity, and excellent weather-resistance. In addition, hard polyurethane foam is excellently heat resistant. Accordingly, where HVAC ducts and defroster ducts are integrally formed in the instrument panel, the ducts are prevented from becoming wet with condensation. In addition, forming the synthetic resin base material from hard polyurethane foam makes it possible to mold the synthetic resin base material by reaction injection molding (RIM). This prevents a die from being subjected to high injection pressures, thus eliminating the need to use a large die or a large die fastening device, and thus reducing costs of machinery. Further, this makes it possible to stably mold a synthetic resin base of a large, complicated shape.

Hard polyurethane foam with a density of $0.35$ $g/cm^3$ or greater ensures the required bending strength and bend elastic constant, hence rendering the instrument panel excellently strong. A hard polyurethane foam with a density of $0.85/cm^3$ or less renders the instrument panel even more excellently heat-resistant. This securely prevents the ducts integrated in the instrument panel from being wet with condensation.

Further, in this invention, a plurality of ribs are integrally formed on the rear of the synthetic resin base material. This further enhances the strength and rigidity of the synthetic resin base material.

In this case, the ribs compose the walls of blower passages. Opening surfaces defined by the walls are closed by covering materials, thereby defining two or more blower passages. Defined in the blower passages are passage openings provided for the HVACs and defrosters. Thus, the ribs function as reinforcements for the synthetic resin base material and compose the sidewalls of the HVAC and defroster ducts. This eliminates the conventional need to attach separately prepared HVAC and defroster ducts to the lower face of the instrument panel. The HVAC and defroster ducts can be integrally formed in the instrument panel. This allows a degree of freedom in the design of the ducts or suchlike, simplifies fitting of the ducts or suchlike and, consequently, greatly reduces costs.

In the module provided by the present invention, various devices such as meters are stably mounted in the instrument panel of the configuration described above. Unlike a conventional instrument panel structured of sheet metal, in which various devices are directly mounted, the instrument panel according to the present invention prevents displacement of the devices, requires fewer man-hours for assembly and greatly reduces the number of components (and the number of component items) required to mount the various devices. In such a module according to the invention, connectors or suchlike can be compactly gathered in one place (which contributes to improved maintenance) and the cables and suchlike of electronic devices are fixed in position to restrain connector vibration (which prevents connector trouble in the electronic devices).

Further, the present invention provides a vehicle in which the frame fixable section of the module of the foregoing configuration is fixed to a cab frame so as to dispose the instrument panel in front of a driver's seat in a cab. Since the frame fixable section of the module is fixed to a vehicle body frame, the instrument panel can be easily and stably fitted in the vehicle. In the vehicle according to the present invention, the instrument panel (module) installed in the cab can ensure strength substantially identical to that of a conventional instrument panel structured of sheet metal, in which various devices are directly mounted. Accordingly, even if the vehicle is subjected to strong vibration or impact, the falling of devices mounted in the instrument panel or damage to the instrument panel itself is prevented.

EXPLANATION OF LETTERS OR NUMERALS

1 INSTRUMENT PANEL
2 SKIN MATERIAL
2' RESIN LAYER
3 SYNTHETIC RESIN BASE MATERIAL
4 METAL SUPPORT
5 FIRST COVERING
6 SECOND COVERING
7 SCREW
8 FRAME FIXABLE SECTION
9 FIRST FIXABLE PART
10 SECOND FIXABLE PART
11 FIRST SWITCH MOUNTING OPENING
12 METER PANEL MOUNTING OPENING
13 STEERING SHAFT INSERTION OPENING
14 SECOND SWITCH MOUNTING OPENING
15 STEREO MOUNTING OPENING
16 LIQUID CRYSTAL MONITOR MOUNTING OPENING
17 HVAC MOUNTING OPENING
18 ASH TRAY MOUNTING OPENING
19 GLOVE BOX

20 ACCOMMODATING PART
21 AIR BLOWER OUTLET FOR HVAC
22 AIR BLOWER OUTLET FOR DEFROSTER
23 THROUGH OPENING
24 INSTRUMENT MOUNTING SECTION
25 SIDE SUPPORT PORTION
26 REAR SUPPORT PORTION
27 INSTRUMENT MOUNTING HOLE
28 BOTTOM SUPPORT PORTION
29 DEFROSTER DUCT
30 HVAC DUCT
31 FIRST RIB
32 SECOND RIB
33 SCREW
41 LOWER PIECE
42 UPPER PIECE
43 MIXTURE
44 INJECTION INLET
45 MOLDING SPACE

BEST MODE FOR CARRYING OUT THE INVENTION

Referring to the accompanying drawings, there will be described a preferred embodiment of the present invention in detail. The description below exemplifies an instrument panel and a module, which are installed in the cab of a dump truck. However, the present invention is not limited thereto but can equally be applied in various other vehicles such as work vehicles and ordinary passenger-cars. Among such various vehicles, the present invention is very suitable for work vehicles highly susceptible to vibration or impact during operation.

Figure 1:
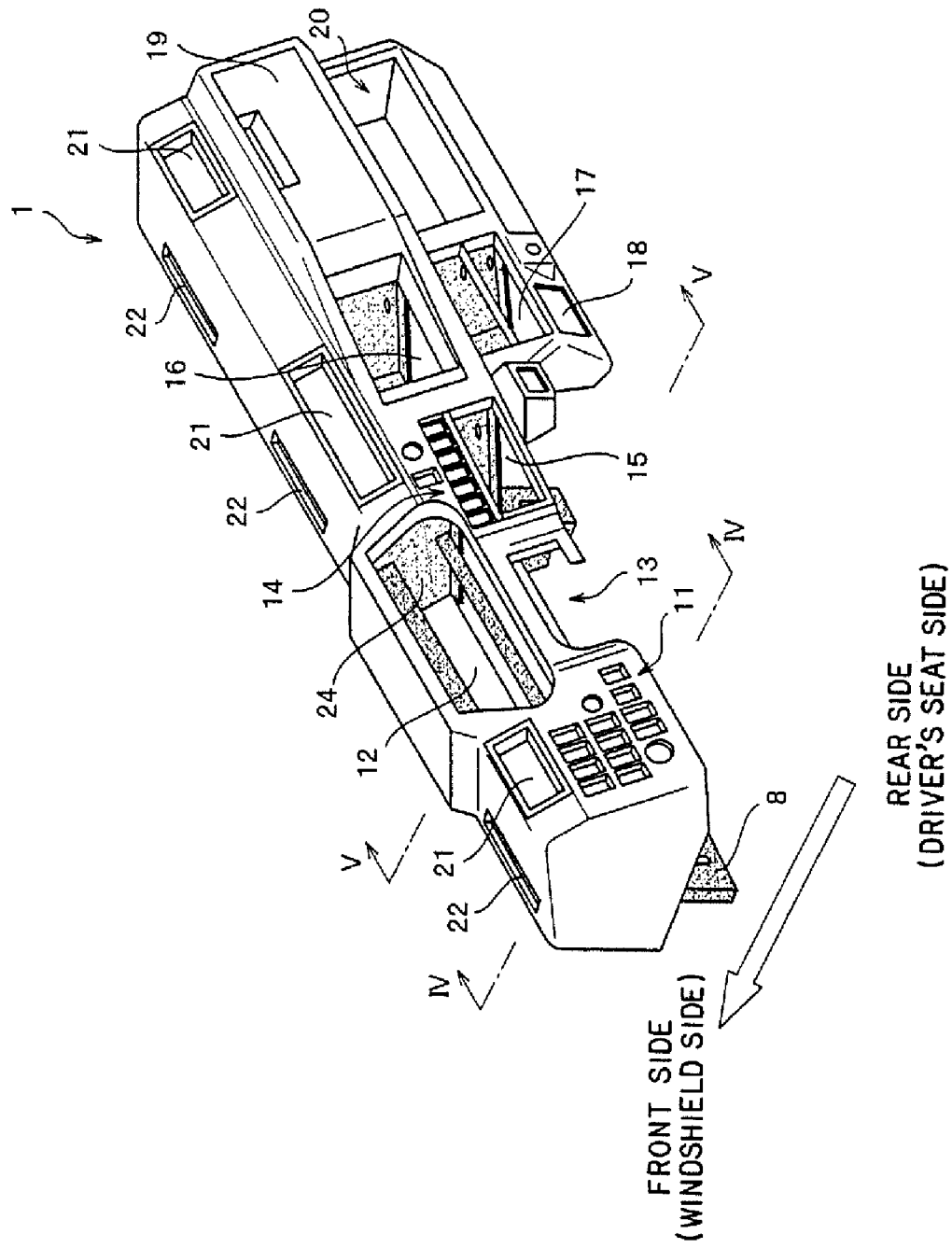
FIG. 1 is a perspective view of an instrument panel according to the present invention as viewed from obliquely upward from the driving seat side.
Figure 2:
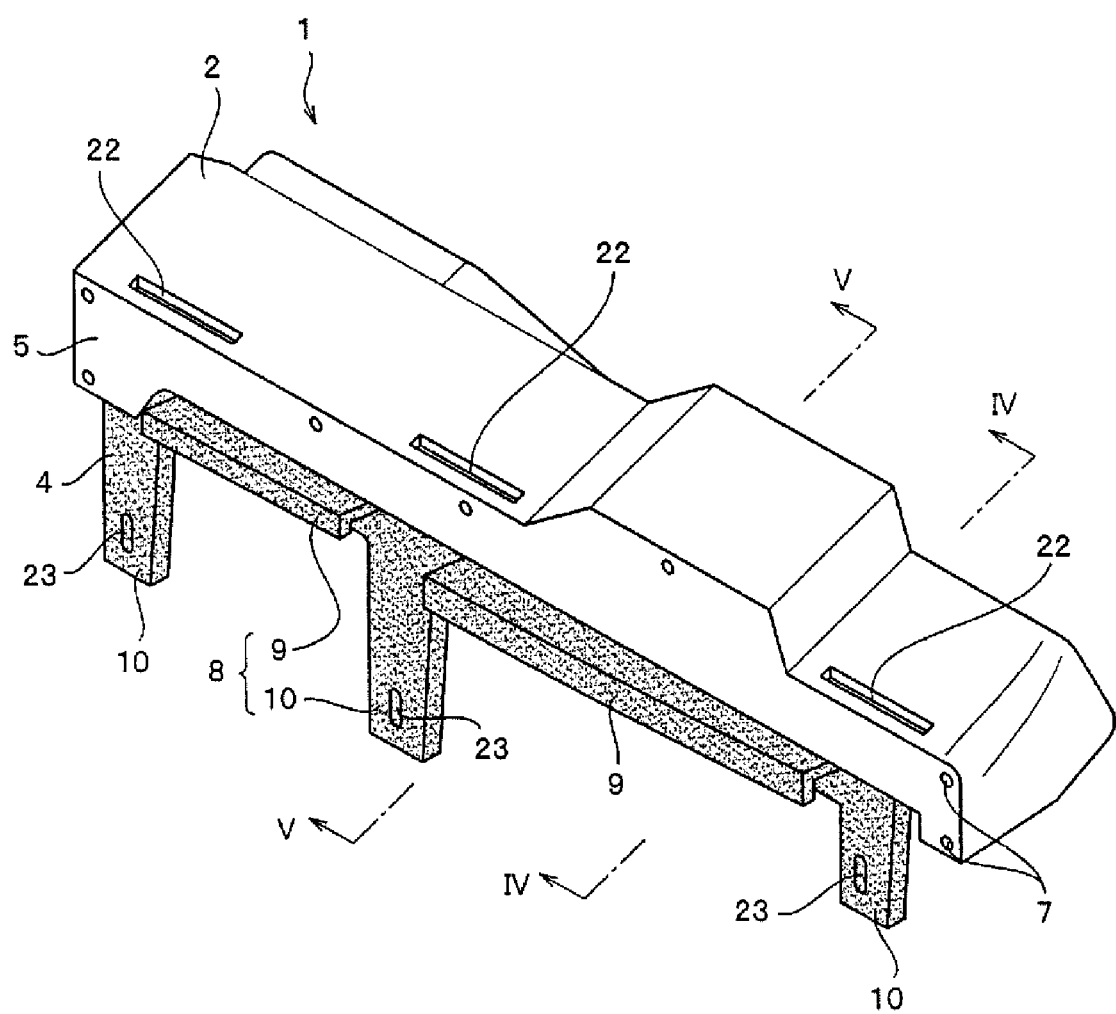
FIG. 2 is a perspective view of the instrument panel as viewed from obliquely upward from the windshield side.
Figure 3:
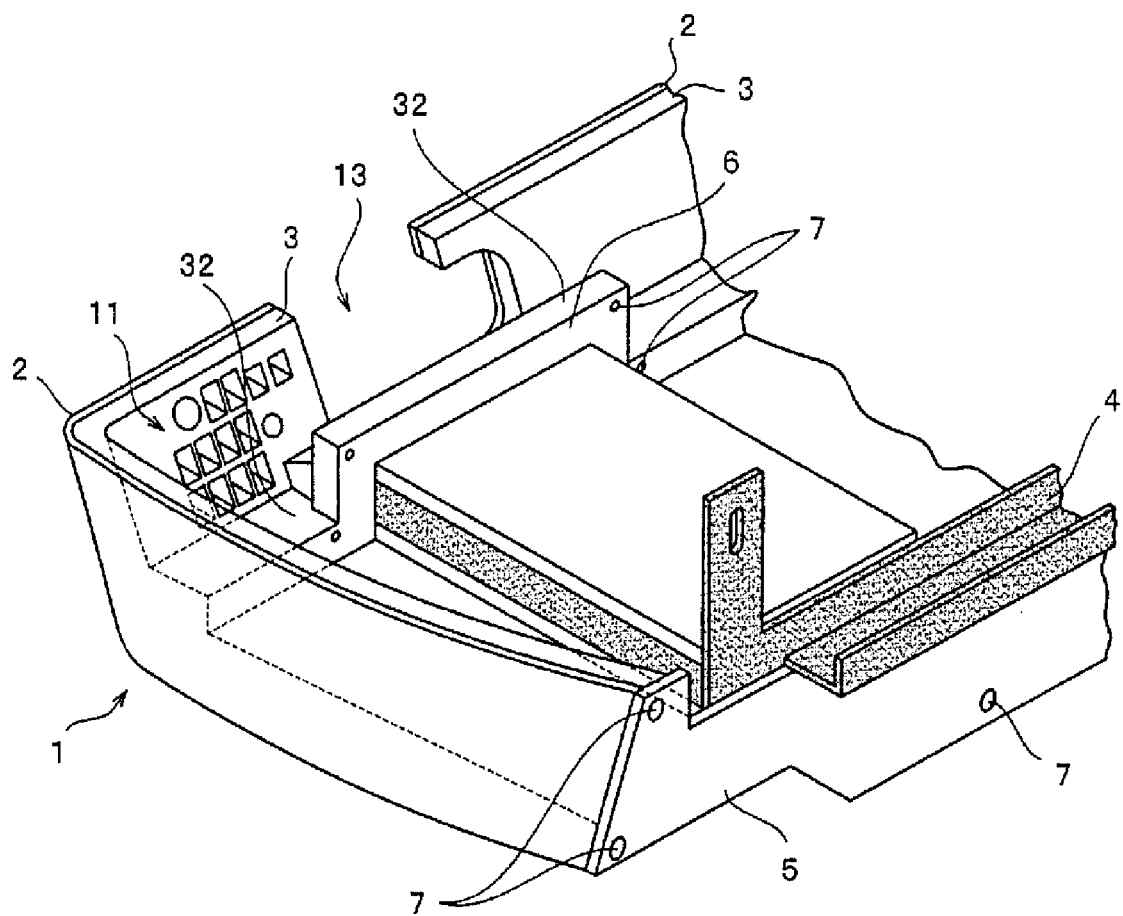
FIG. 3 is a partial perspective view of the instrument panel as viewed from the rear.
Figure 4:
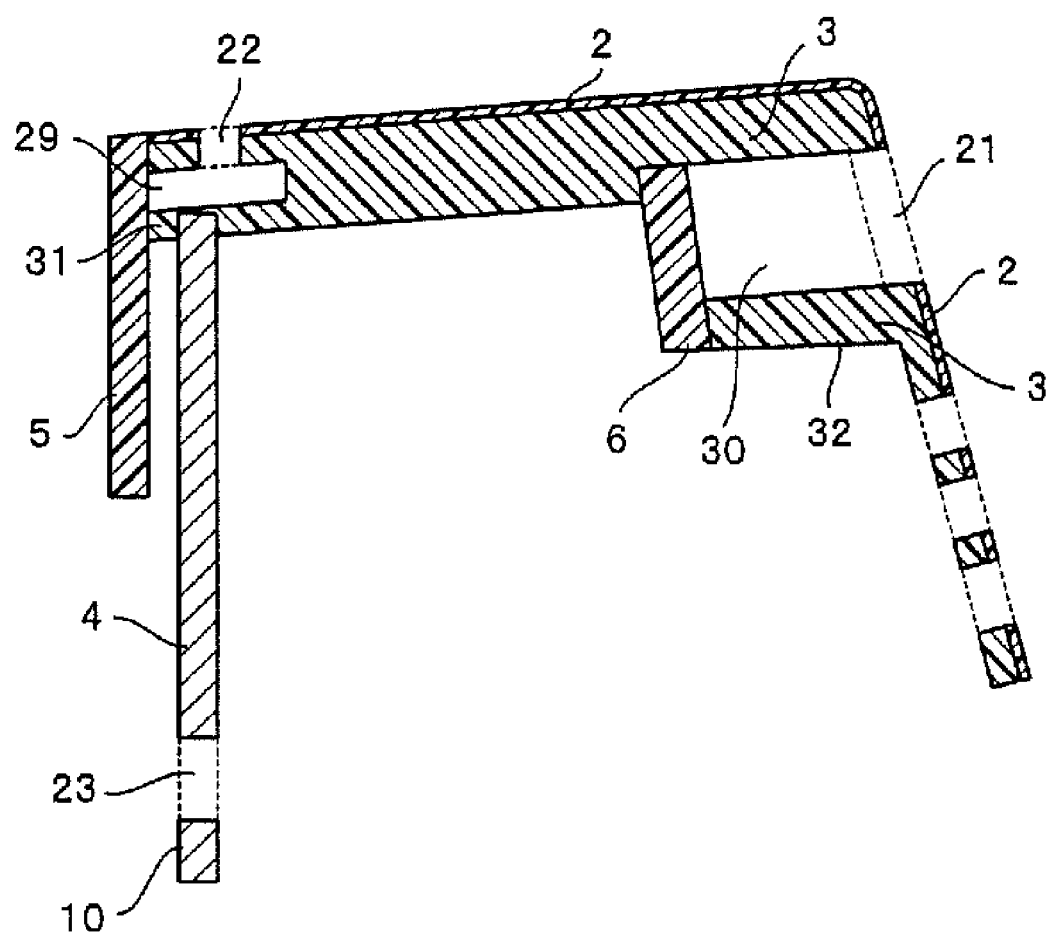
FIG. 4 is a sectional view taken from the plane indicated by the line IV-IV shown in FIGS. 1 and 2.
Figure 5:
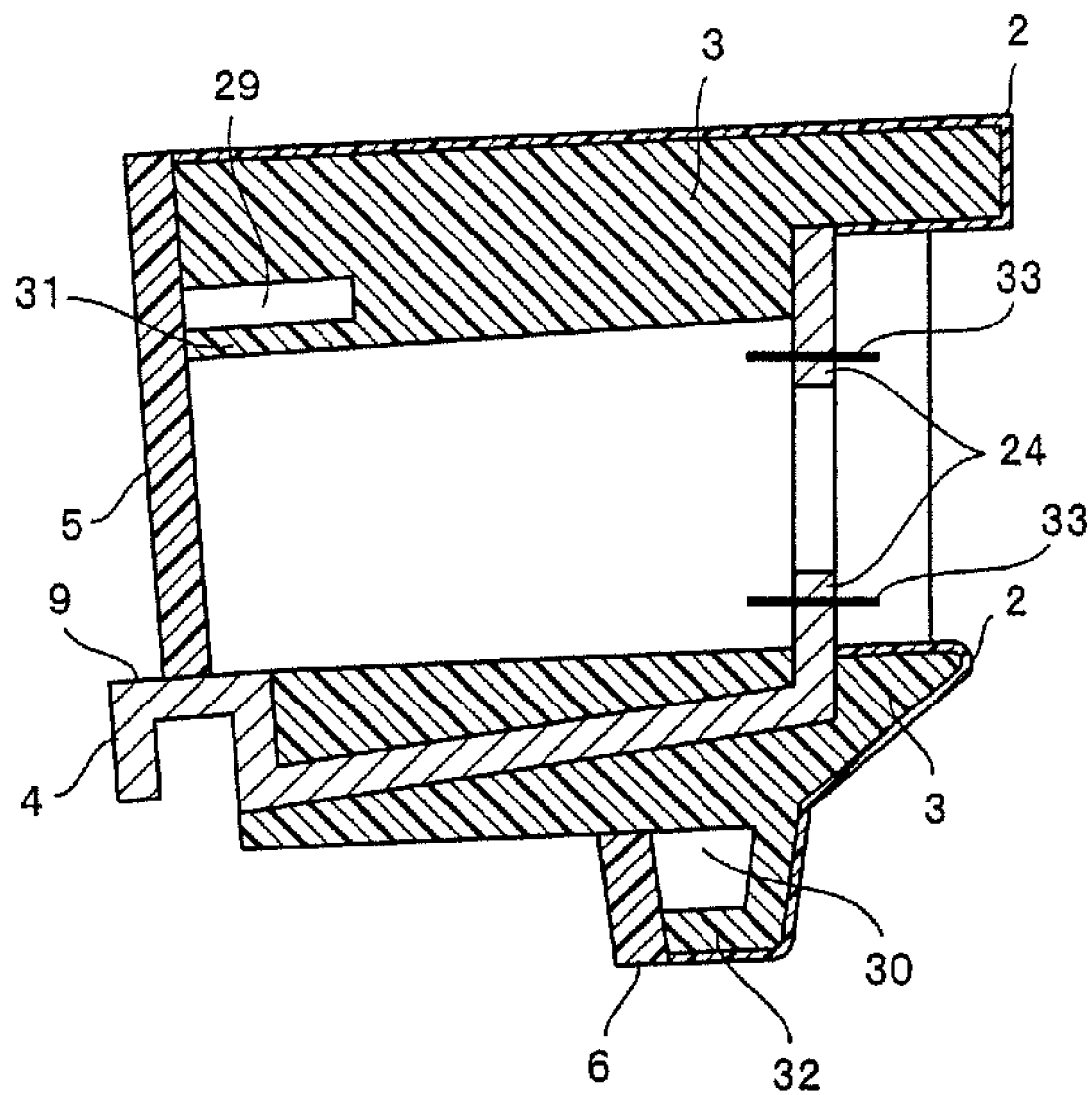
FIG. 5 is a sectional view taken from the plane indicated by the line V-V shown in FIGS. 1 and 2.

FIG. 1 is a perspective view of an instrument panel as viewed from obliquely above the driving seat side, FIG. 2 is a perspective view of the instrument panel as viewed from obliquely above the windshield side, and FIG. 3 is a partial perspective view of the instrument panel as viewed from the rear. FIG. 4 is a sectional view taken from the plane indicated by the line IV-IV shown in FIGS. 1 and 2. FIG. 5 is a sectional view taken from the plane indicated by the line V-V shown in FIGS. 1 and 2. In the description of the invention, forward from the instrument panel corresponds to the direction toward the windshield as viewed from the driving seat, and backward from the instrument panel corresponds to the direction toward the driving seat. The left and right directions of the instrument panel correspond to left and right directions respectively as viewed from the driver's seat.

The instrument panel as shown in FIGS. 1 to 3 has a specific appearance and dimensions so as to be installed in front of the driving seat in the cab of the dump truck. Defined in the driving seat side surface (i.e., rear surface) of the instrument panel 1 are openings in which various devices and switches are installed.

Specifically, defined in the left lower part of the driving seat side surface of the instrument panel 1 is a first switch mounting opening 11 for disposing various switches in. Vertically installed on the right side of the first switch mounting opening are a meter panel mounting opening 12 for mounting therein a meter panel in which meters and suchlike are installed, and a steering shaft insertion opening 13 in which the steering shaft of a handle is inserted.

Installed in predetermined places on the right side of these are a second switch mounting opening 14 for disposing various switches in, a stereo mounting opening 15, a liquid crystal monitor mounting opening 16, a HVAC mounting opening 17, and an ash tray mounting opening 18. Additionally, on the right side of the driver's side surface of the instrument panel 1 are a glove box 19, accommodating part 20, etc.

In the upper part of the driver's side surface of the instrument panel 1 are three air blower outlets 21 for use as passage-openings provided for the HVAC. In the upper face of the instrument panel 1 at the windshield side are three rectangular air blower outlets 22 for use as passage-openings provided for a defroster.

Such an instrument panel 1 according to the present embodiment, as shown in FIGS. 4 and 5, is formed from a skin material 2 installed as protective member for the external surface of the instrument panel 1; a synthetic resin base material 3 covered integrally with the skin material 2; and a metal support 4 formed integrally with the synthetic resin base material 3 by insert molding. Parts of the metal support 4 is installed project from the synthetic resin base material 3.

The surface member 2, synthetic resin base material 3, and metal support 4 are integrally molded as described below in detail. In the instrument panel 1 according to the present embodiment, a first covering 5 made of a synthetic resin is installed on the front side of the instrument panel 1 (i.e., on the opposite side to the driver's seat), and a second covering 6 made of a synthetic resin is installed on the rear side of the instrument panel 1. These first and second covering materials 5 and 6 are molded separately from the instrument panel 1 and then fastened to the instrument panel 1 with screws 7 or bolts.

In the present embodiment, an excellently weather resistant aliphatic polyurethane is used as the skin material 2, and the surface of the skin material has grain. Various colors can be applied to the skin material 2 by adding pigments. This makes it possible to select color or gloss for the skin material as necessity requires. This prevents, for example, the surface of the instrument panel 1 from being reflected onto the windshield. This skin material 2 is integrally spread in a film with a thickness of 0.6 to 0.9 mm over the surface of the synthetic resin base material 3 (esp., the external surface of the instrument panel 1) by an in-mold coating method. As other materials for the skin material, a thermoplastic resin, thermoplastic elastomer, or suchlike can also be used.

It is preferable that the skin material 2 have such a degree of adhesive force (i.e., adhesion) to the synthetic resin material 3 that if the adhesive force of the skin surface 2 is tested using a cross-cut tape test method (100 squares at an interval of 1 mm) as defined in JIS (Japanese Industrial Standard)-K-5400, peeling of the skin material 2 off the synthetic resin material 3 will occur in none of the squares. This makes is possible to maintain the appearance of the instrument panel for a long time.

As the synthetic resin base material 3, a conventionally used synthetic resin (e.g., a polyolefin resin such as polypropylene, a styrene resin such as an AES resin, or polyurethane) can be used. Among them, hard polyurethane foam is especially preferable. Hard polyurethane foam makes it possible not only to form any complicated shape at a low cost by using an RIM (Reaction Injection Molding) molding method, but also to stably ensure lightness of weight and high rigidity. The bubbles of the hard polyurethane foam are independent from one another, and a thin, smooth skin layer is formed on the faces of the molding.

Figure 10:
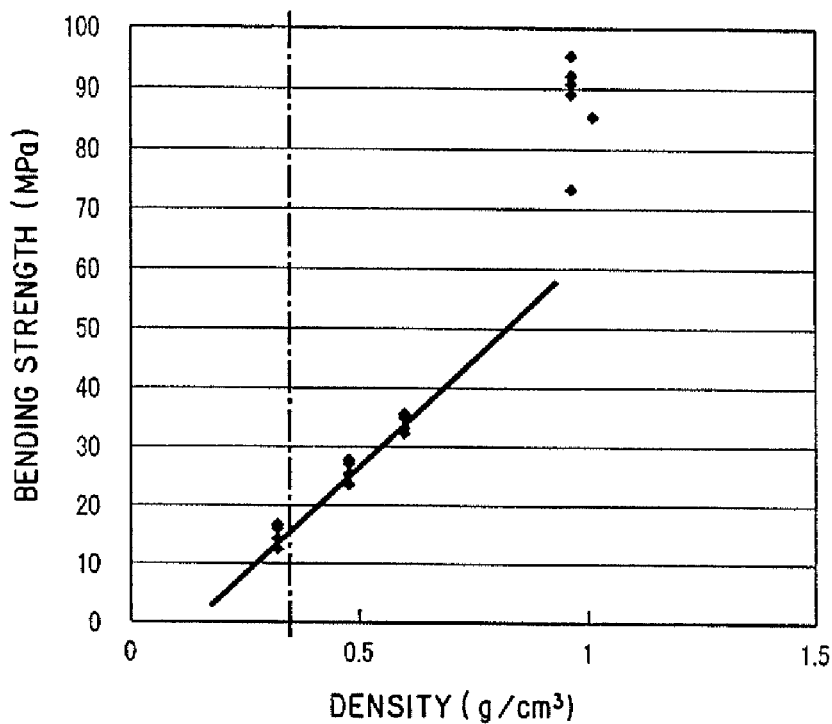
FIG. 10 is a graph representing the interrelation between the density of hard polyurethane foam and its bending strength.
Figure 11:
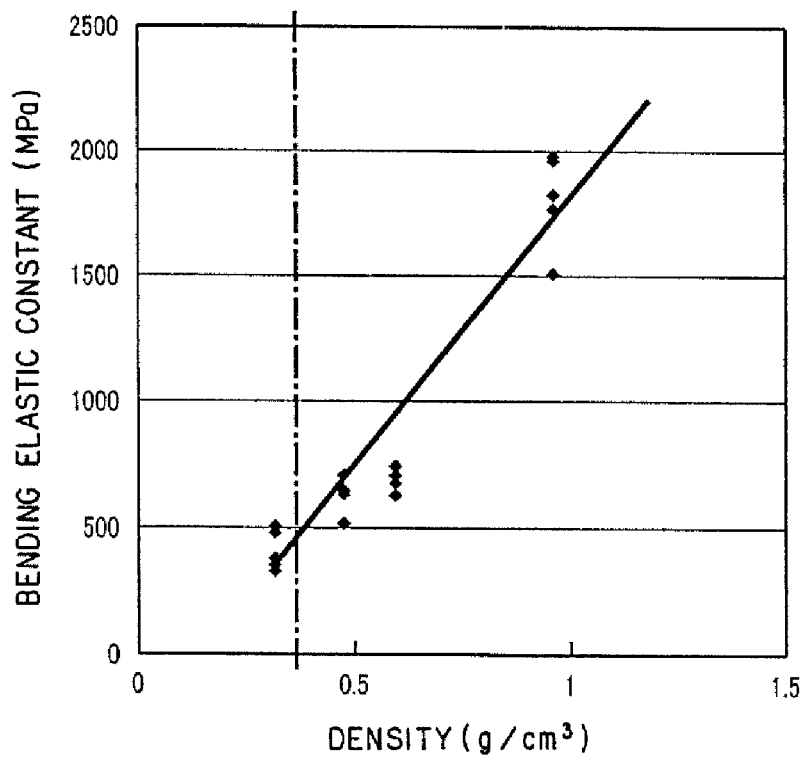
FIG. 11 is a graph representing the interrelation between the interrelation between the density of hard polyurethane foam and its bend elastic constant.
Figure 12:
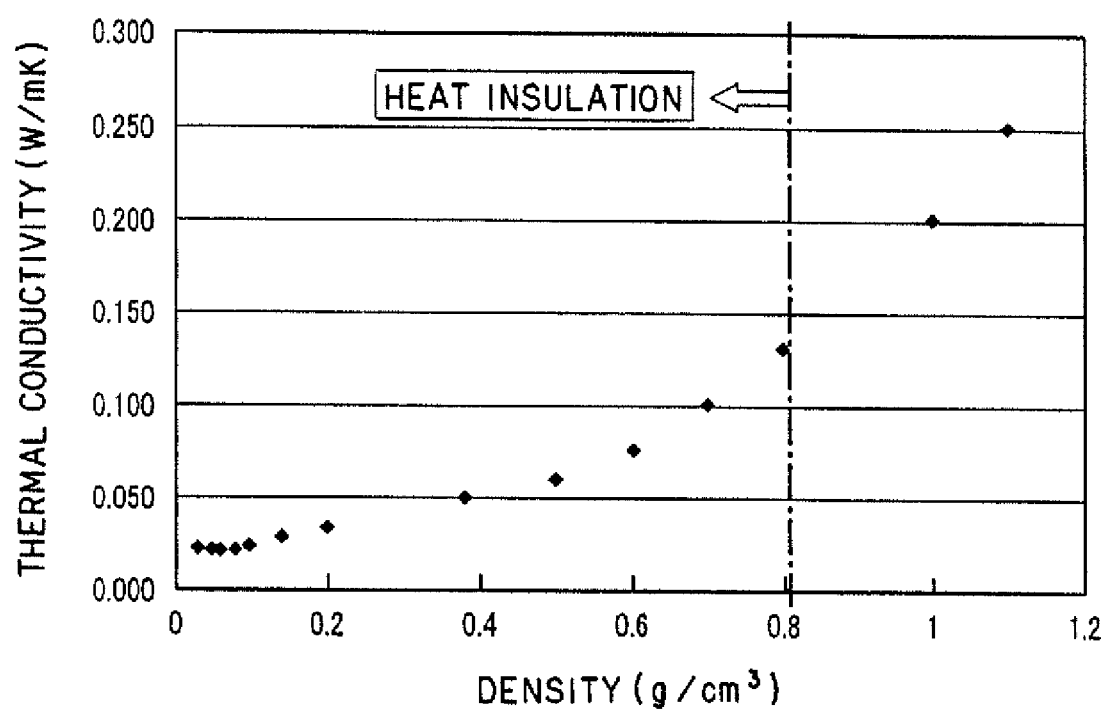
FIG. 12 is a graph representing the interrelation between the density of hard polyurethane foam and its heat insulation.

It is preferable that the density of the hard polyurethane foam be 0.35 $g/cm^3$ or more and 0.85 $g/cm^3$ or less. The interrelation between the density of the hard polyurethane foam and its bending strength, the interrelation between that and the bend elastic constant, and the interrelation between that and heat insulation are shown in FIGS. 10, 11, and 12 respectively. If the density of the hard polyurethane foam is lower than 0.35 $g/cm^3$, both the bending strength and bend elastic constant of the hard polyurethane foam are also low, as shown in FIGS. 10 to 11. This may lead to weakness in the instrument panel 1.

On the other hand, if the density of the hard polyurethane foam exceeds $0.85/cm^3$, heat conductivity increased, as shown in FIG. 12. This does not ensure the required insulation. Where a part (e.g., a wall) of the duct is formed of hard polyurethane foam, the high heat conductivity of the hard polyurethane foam causes condensation near the surface of the duct. As shown in FIGS. 10 to 12, hard polyurethane foam with a density of $0.35$ g/cm$^3$ or more and $0.85$ g/cm$^3$ or less has a bending strength of substantially 15 MPa or greater and a bend elastic constant of substantially 500 MPa or greater. This allows the formation of an instrument panel of exceptional strength that prevents condensation caused by high insulation.

It is preferable that the skin material 2 of the instrument panel 1 and the synthetic resin base material 3 according to the present embodiment be a fire resistant material that meets FMVSS (Federal Motor Vehicle Safety Standards).

The metal support 4 is molded integrally with the synthetic resin base material 3 by insert molding so that parts of the metal support 4 project from the synthetic resin base material 3. Formed at the front side of the instrument panel 1 and in an area of the metal support 4 projecting from the synthetic resin base material 3 is a frame fixable section 8, which can be fitted and fixed to the cab frame on the dump truck.

This fixable section 8 includes first fixable parts 9 bent so as to be hooked and fixed onto the cab frame, and second fixable parts 10 extending downward from the first fixable parts 9 and having through openings 23 so that the second fixable parts 10 can be fixed to the cab frame with screws and bolts. The first fixable parts 9 are of predetermined dimensions along side the vehicle's width. The second fixable parts 10 extend downward on the left and right sides and almost in the middle of the instrument panel 1 in alongside the vehicle's width and have the through openings 23 in their leading ends.

In the present invention, the configuration of the frame fixable section 8 is not limited thereto as long as the instrument panel 1 can stably be fixed to the cab frame. For example, the bent first fixable parts 9 may be lower than described above and the second fixable parts 10 having the screw or bolt holes may be installed upper of the first fixable parts 9. Alternatively, these second fixable parts 10 may be installed in two areas (upper and lower) at the front side of the instrument panel 1 without disposing the first fixable part 9. In these examples, it is preferable that the frame fixable part 8 be configured so that the instrument panel 1 can be fixed to the cab frame in the two fixing areas (the upper and the lower).

In addition to the frame fixable section 8, the metal support 4 has an instrument mounting section 24 where it projects from the synthetic resin base material 3. In the mounting section 24, various heavy devices (i.e., the meter panel, stereo, liquid crystal monitor, HVAC, etc.) can be mounted. That is, the single metal support 4 has: the frame fixable section 8, which can be fixed to the cab frame; and the instrument mounting section 24, in which the various such devices are mounted.

Figure 6:
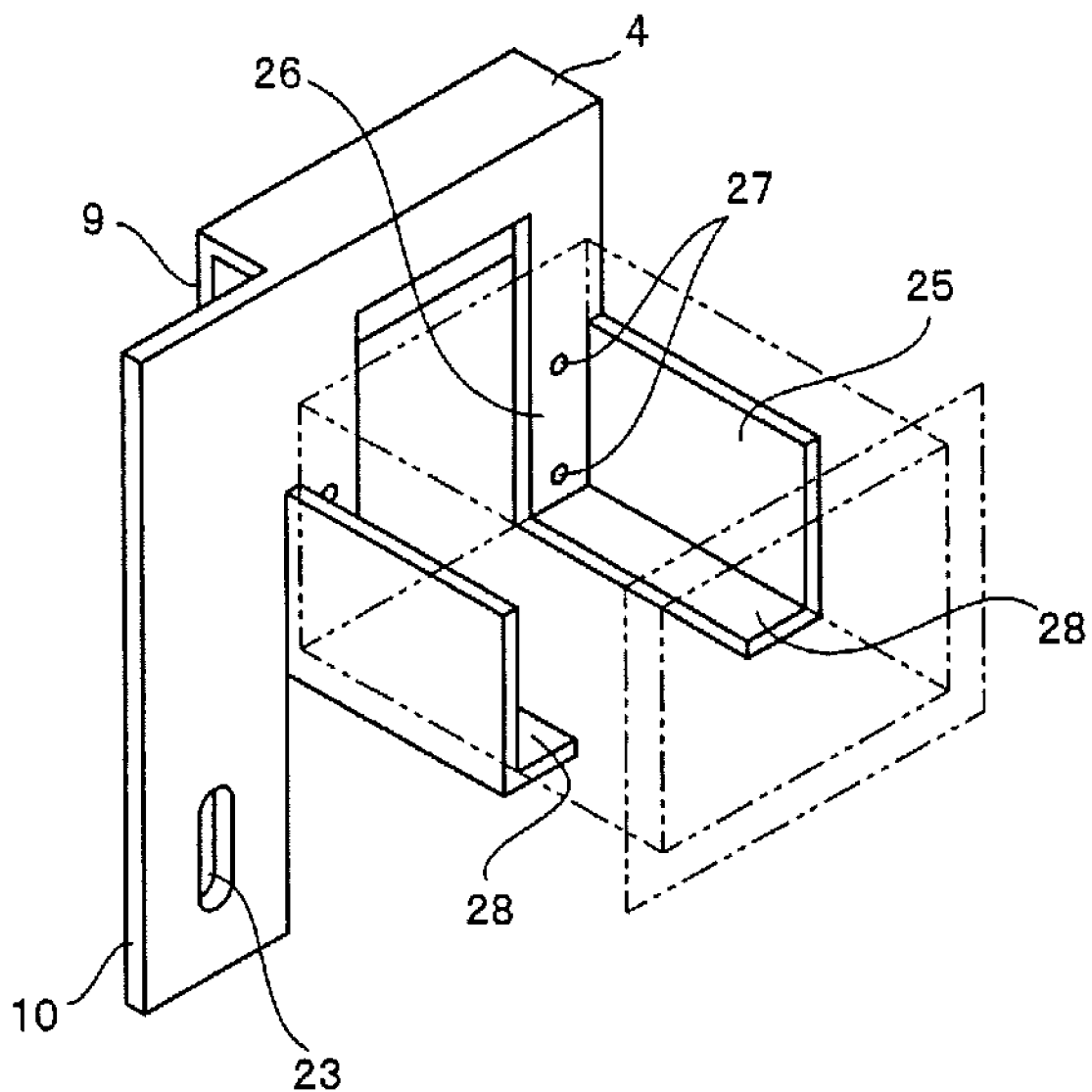
FIG. 6 is a schematic three-dimensional view of the shape of part of a metal support.

FIG. 6 is a schematic three-dimensional view of the shape of part of the metal support 4. In order to mount a heavy instrument (e.g., the liquid crystal monitor) in each mounting opening of the instrument panel 1, the instrument mounting section 24 has, as shown in FIG. 6, side support portions 25 and a rear support portion 26 supporting the left and right sides and rear side of the heavy apparatus. The rear support portion 26 for each apparatus has instrument mounting holes 27, upper and lower, for fastening the apparatus with screws and bolts. It is preferable for the instrument mounting section 24 to have a bottom support portion 28 so that the apparatus is supported at the bottom as well. In FIG. 6, the position of a heavy apparatus which may be so mounted is indicated by lines representing clearly the imaginary shape of the metal support 4. In FIG. 6, the synthetic resin base material 3 directly touches and supports the heavy apparatus top and bottom faces with which the instrument mounting section 24 is not in contact. Accordingly, each apparatus can be mounted more stably.

In the instrument panel 1 according to the present embodiment, a cable accommodation groove (not shown) for accommodating a cable for each electric apparatus (e.g., the liquid crystal monitor) may be formed in a predetermined part of the synthetic resin base material 3. Forming such a cable accommodation groove makes it possible to accommodate and fix the cable for any corresponding electronic apparatus into the cable accommodation groove when a module is composed by mounting the electronic apparatus into the instrument panel 1.

In the present embodiment, formed on the rear side of the synthetic resin base material are, as shown in FIGS. 4 and 5, a first rib 31 serving as a wall for a defroster duct 29 and a second rib 32 serving as a wall for a HVAC duct 30. The functions of first and second ribs 31 and 32 are to ensure the strength and rigidity of the instrument panel 1.

Formed along the first rib 31 and second rib 32 are the above-mentioned first covering 5 and second covering 6, which are made of hard polyurethane foam. The first and second covering materials 5 and 6 are stuck in advance along the first and second ribs 31 and 32 respectively with an adhesive. When the first and second covering materials 5 and 6 have been stuck to the first and second ribs 31 and 32 respectively, they are firmly fixed together with screws 7, such as tap screws, driven from several parts of the ribs. Air introduction holes (not shown) are defined in corresponding predetermined parts of the first and second covering materials 5 and 6. Formed around the air introduction holes are connection parts (not shown) for connecting to corresponding external ducts (not shown), one for the defroster and the other, for the HVAC.

The first covering 5 and second covering 6 are attached to the first rib 31 and second rib 32 respectively. Thereby, in addition to functioning as reinforcement, the first rib 31 and second rib 32 installed on the rear of the synthetic resin base material 3 define the side walls of the defroster duct 29 and HVAC duct 30. Thus, the rib 31 and covering 5 define the defroster duct 29, and the rib 32 and covering 6, the HVAC duct 30. This defroster duct 29 is connected to the three air blower outlets 22 provided for the defroster, and the HVAC duct 30 is connected to the three air blower outlets 21 provided for the defroster. This eliminates the need to directly mount the defroster duct and the HVAC duct in the defroster air blower outlet and the HVAC air blower outlet respectively from the back of the instrument panel.

In addition, a conventional duct is formed from a pipe made of a hard synthetic resin and is, therefore, highly susceptible to the condensation of dew in cold regions. This makes metal parts or suchlike around the ducts highly likely to rust. In the present embodiment, since the first and second ribs 31 and 32 and the first and second covering materials 5 and 6 are formed from hard polyurethane foam of excellent heat insulation, as described above, the defroster duct 29 and HVAC duct 30 are prevented from being wet with dew. In addition, through the process of molding, a thin smooth skin layer forms on the walls of the first and second ribs 31 and 32 and also on the internal faces of the first and second covering materials 5 and 6. Such skin layers make airflow in the defroster and HVAC ducts 29 and 30 extremely smooth.

In addition, the first and second ribs 31 and 32 allow the most rational designs of defroster and HVAC air passages and, unlike a conventional duct installed separately, the need for a design avoiding interference with surrounding apparatus is obviated, which increases the degree of freedom in the design of ducts or suchlike. Since the first rib 31 and second rib 32 defining the sidewalls of the ducts 29 and 30 respectively are molded integrally with the synthetic resin base material 3. This contributes to a great reduced costs.

The first covering 5 is mounted to the instrument panel 1, thereby forming a front face for the instrument panel 1. However, the present invention is not limited thereto and the first covering 5 may be used as a member that simply covers the length of the first rib 31.

Figure 7:
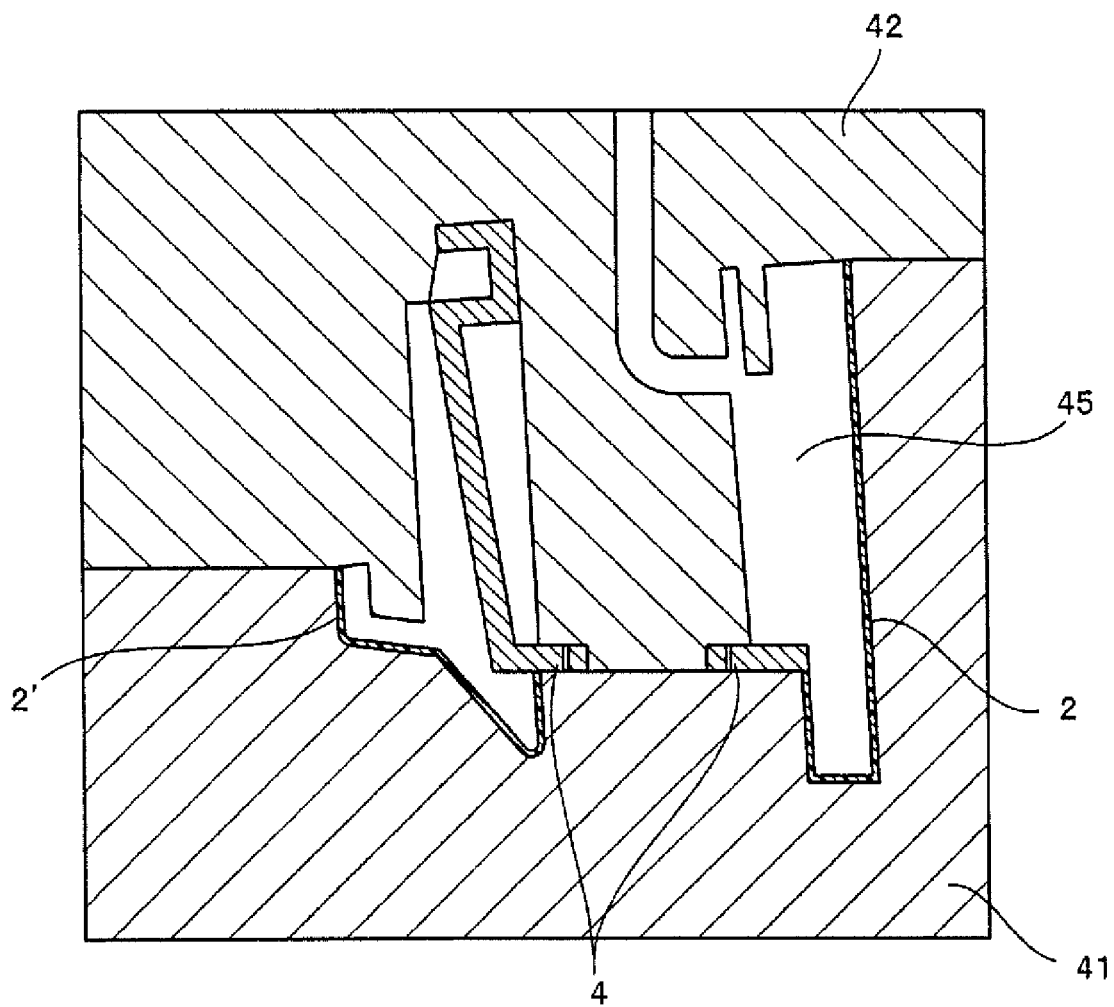
FIG. 7 is a schematic sectional view of a die when its die pieces are fastened together to manufacture the instrument panel according to the invention.
Figure 8:
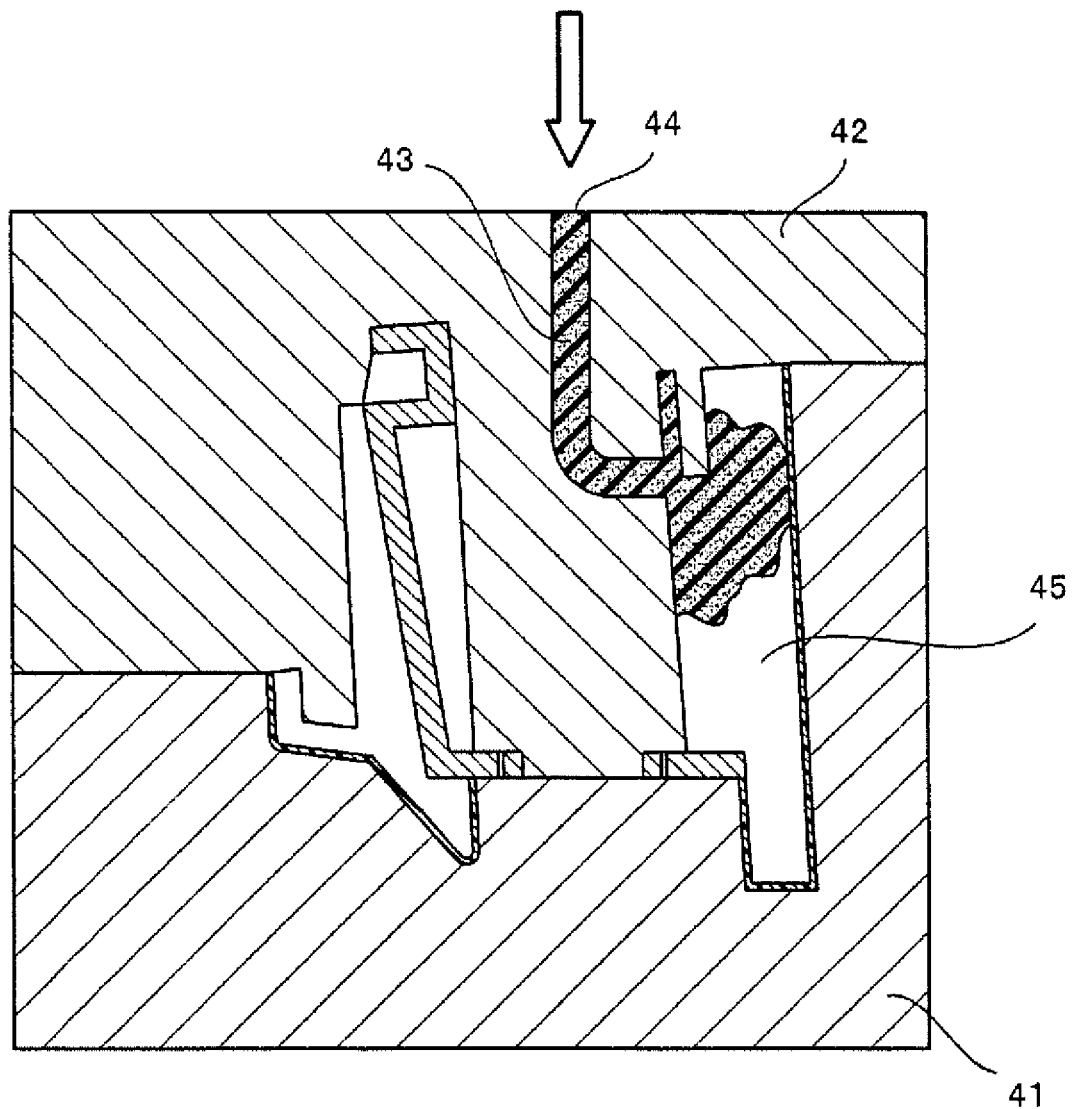
FIG. 8 is a sectional view of the initial state of a mixture of polyol, diisocyanate, and water injected into a molding space defined in the die.
Figure 9:
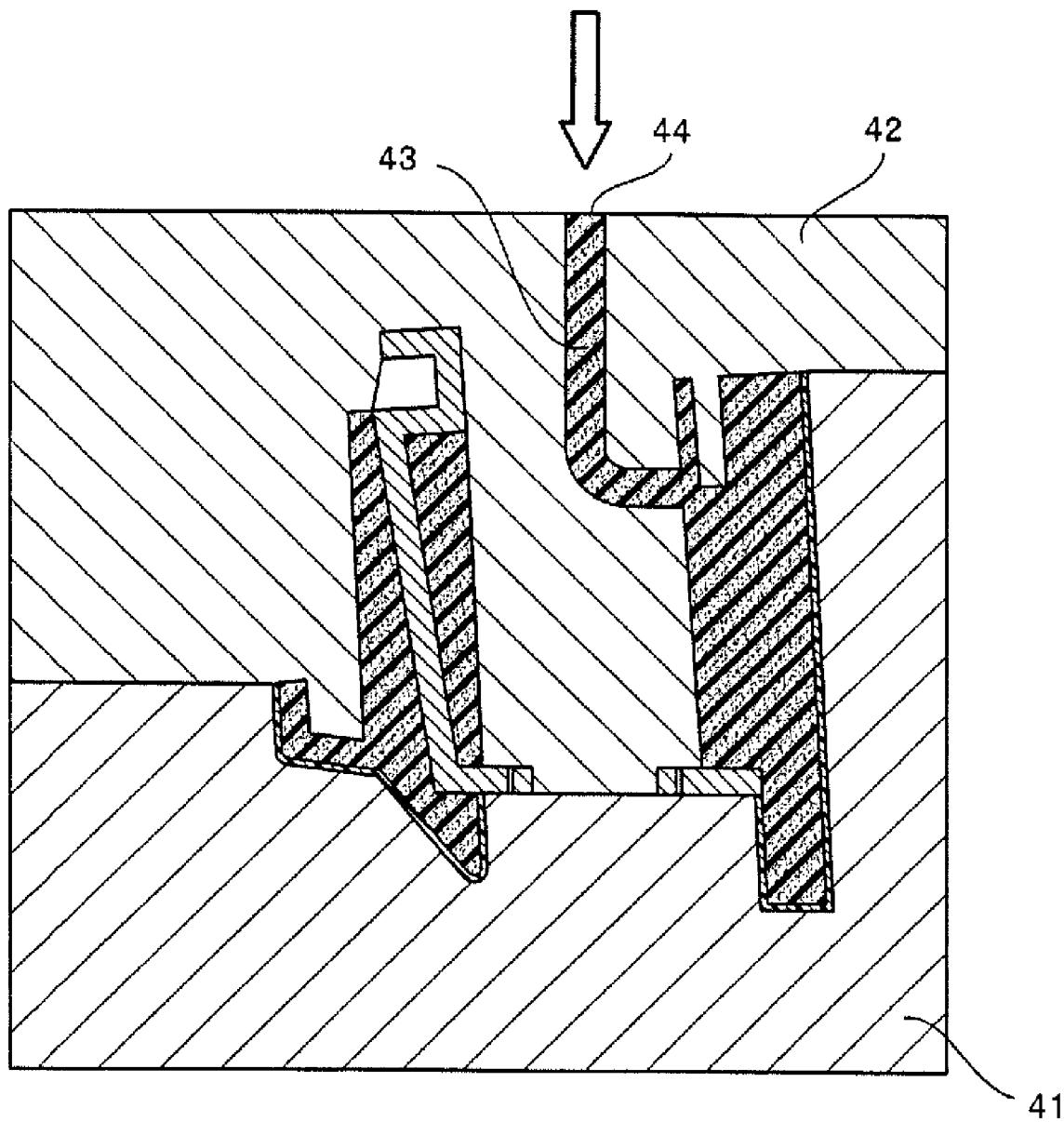
FIG. 9 is a sectional view of a state in which the foaming mixture in the molding space of the die has finished a foaming reaction.

An instrument panel 1 of the foregoing configuration is manufactured by reaction injection molding (RIM) in a manner described below. It should be understood that the present invention is not limited thereto but various changes or modifications may be made and the description below is just an example of a method for manufacturing the instrument panel of the present invention. FIGS. 7 to 9 schematically show a procedure for molding the instrument panel 1.

First, a ZAS die inexpensive and suitable for fine processing is prepared as a molding die. In order to form a skin material 2 integrally with a synthetic resin base material 3 by an in-mold coating method, paint is sprayed onto the surface of the cavity of a lower die piece 41, thereby forming a resin layer 2' for use as a skin material 2. Simultaneous with this formation, the face of the resin layer 2', which is in contact with the lower die piece 41, will have grain. In the present invention, a method for forming the skin material 2 integrally with the synthetic resin base material 3 is not limited thereto. In lieu of this method, the following method may be used: a sheet-like skin material 2 is separately formed, a particular shape is given to the skin material 2, then the shaped skin material 2 is set on the surface of the cavity of the lower die piece 41, and then the RIM described below is undertaken. The molding die is not limited to the ZAS die, in particular, and a resin die (for example) may be used.

Next, simultaneous with the formation of the resin layer 2' on the surface of the cavity of the lower die piece 41, a metal support 4 to be insert-molded is held in an upper die piece 42 by means of magnets attached to the upper die piece 42 (for example). The metal support 4 held in the upper die piece 42 is of a predetermined shape and has frame fixable section 8 and an instrument mounting section 24. Parts of the frame fixable section 8, which will form first fixable parts 9, have been bent. Through openings 23 have been also made in the leading ends of parts that will form second fixable parts 10.

Subsequently, as shown in FIG. 7, the lower die piece 41 having a resin layer 2' formed therein and the upper die piece 42 having the metal support 4 held therein are fastened together, and then polyurethane is reaction injection molded (RIM). In this case, in order to form a synthetic resin base material 3 of predetermined shape, a core (not shown) can be inserted between the lower and upper die pieces 41 and 42.

As shown in FIG. 8 polyurethane is subject to the RIM by injecting a mixture 43 of polyol, diisocyanate, and water (mixed by, for instance, a mixing head, not shown) is injected from the injection inlet 44 in the upper die piece 42 into a molding space 45 defined between the lower and upper die pieces 41 and 42. In this case, the quantity of water mixed with the polyol and diisocyanate is determined according to the degree of foaming. In this embodiment, the expansion ratio of hard polyurethane foam is set to three times. The mixture 43 guided into the molding space 45 initiates foaming while generating heat. Consequently, the foaming polyurethane fills the molding space 45 such that the foaming polyurethane is integrated with the skin material 2 (resin layer 2') and metal support 4. Foaming then terminates. In this case, the foaming temperature used is 50 to 60° C.

Thus, a molding in which the skin material 2, the synthetic resin base material 3, and the metal support 4 are integrally molded can be obtained by the RIM. Thereafter, separately molded first and second covering materials 5 and 6 are fixed to the first rib 31 and second rib 32 of the synthetic resin base material 3 of the molding by means of screws 7. Thus, an instrument panel 1 according to the present embodiment can be obtained.

The instrument panel 1 thus produced comprises a module such that heavy devices such as a meter panel, stereo, liquid crystal monitor, HVAC, etc., are fixed to the instrument mounting section 24 of the metal support 4 by means of screws 33 or suchlike and thereby stably mounted and, in addition, various switches, an ash tray, etc., are mounted in predetermined places.

Further, this module has been formed such that the first fixable parts 9 of the frame fixable section 8 of the metal support 4 are hooked onto a cab frame, and the second fixable parts 10 of the frame fixable section 8 are fixed to the cab frame by means of screws or bolds. Simultaneously, an external duct for a defroster and an external duct for an HVAC are connected to the connection parts (not shown) formed on the first and second covering materials 5 and 6 respectively. This makes it possible to firmly and stably fix the instrument panel 1 in front of the driving seat in the cab of a dump truck.

The foregoing instrument panel 1 according to the present invention can ensure strength and rigidity sufficient to withstand vibration or impact applied during heavy work, since the metal support 4 is insert-molded in the synthetic resin base material 3 and the first fixable parts 9 and second fixable parts 10 of the metal support 4 are fixed to the cab frame extending the width of the dump truck. This provides an excellent instrument panel that prevents damage to the synthetic resin base material 3 and withstands vibration even in severe work environments and is durable in the long term use. Further, the skin material has grain, which imparts a beautiful satisfying texture to the surface of the instrument panel.

In addition to the first and second fixable parts 9 and 10, the metal support 4 has the instrument mounting section 24 for mounting various devices (e.g., meters) in, thus making it possible to mount the various devices into the metal support 4 of the instrument panel 1 highly stably and support the devices in the support 4 securely. This prevents the devices from being detached or falling even when the apparatus is subjected to heavy vibration or heavy impact load.

In addition, compared to a conventional instrument panel installed in a work vehicle, the man hours required to assembly the instrument panel are reduced, and the number of components for mounting the various devices decreases remarkably. Further, the module in which the devices have been mounted facilitates fitting of the instrument panel to the dump truck.

According to the present embodiment, the cable accommodation grooves (not shown) are formed in the instrument panel 1 in advance and the module is constructed by mounting the various devices in the instrument panel 1. Accordingly, cables for electric devices can be fixed in the cable accommodating grooves. This prevents vibrations affecting connectors and hence connector trouble in the electric devices. Since the connectors (for example) can be gathered in one place, maintenance is improved.

While a typical embodiment of the invention has been described, such a description is for illustrative purpose only. As long as the metal support 4 is insert-molded in the synthetic resin base material 3 and has, not only the frame fixable section 8 where it projects from the synthetic resin base material 3, but also the instrument mounting section 24, various changes or modifications can be made. For instance, two metal supports may be insert-molded in the synthetic resin base material so that each metal support has a frame fixable section and an instrument mounting section.

The invention claimed is:

1. An instrument panel which is installable in front of a driving seat in a cab of a vehicle comprising:
   a synthetic resin base material;
   a skin material integrally covering a surface of the synthetic resin base material;
   a metal support integrally formed in the synthetic resin base material, wherein the metal support is insert-molded such that a part of the metal support projects from inside of the synthetic resin base material;
   a frame fixable section positioned in an area of the metal support projecting from the synthetic resin base material, wherein the frame fixable section is fittable and fixable to a cab frame on the vehicle; and
   the frame fixable section further including:
      a first fixable part bent in a downwardly open hook shape so as to hook on the cab frame and be fixed thereto, the first fixable part extending in a horizontal direction from the synthetic resin base material,
      a second fixable part having a through opening, wherein the second fixable part is fixable to the cab frame with a screw or a bolt, the second fixable part extending in a vertical direction from the synthetic resin base material.

2. The instrument panel according to claim 1, wherein the synthetic resin base material is made of structural foamed polyurethane.

3. The instrument panel according to claim 2, wherein a density of the structural foamed polyurethane is $0.35$ g/cm$^3$ or more and $0.85$ g/cm$^3$ or less.

4. The instrument panel according to claim 1, wherein a plurality of ribs are formed by an integral molding on a rear side of the synthetic resin base material, the ribs composes walls of blower passages, and opening surfaces defined by the walls are closed by covering materials, thereby defining two or more blower passages, and defined in the blower passages are passage openings provided for a HVAC and a defroster.

5. The instrument panel according to claim 2, wherein a plurality of ribs are formed by an integral molding on a rear side of the synthetic resin base material, the ribs composes walls of blower passages, and opening surfaces defined by the walls are closed by covering materials, thereby defining two or more blower passages, and defined in the blower passages are passage openings provided for a HVAC and a defroster.

6. The instrument panel of claim 1, wherein the first fixable part is bent in a downwardly open hook shape in a way that a front end portion of the first fixable part is bent downwardly.

7. The instrument panel according to claim 1, further comprising an instrument mounting section in which at least one device is mountable with a screw or a bolt.

8. The instrument panel according to claim 7, wherein the instrument mounting section comprises:
   a pair of right and left side support portions; and
   a part of right and left rear support portions, both for supporting an apparatus mounted in the instrument mounting section.

9. The instrument panel according to claim 8, wherein each of the right and left rear support portions includes an instrument mounting hole for fastening the apparatus with screws or bolts.

10. The instrument panel according to claim 7, further comprising at least one device mounted in the instrument mounting section.

* * * * *